Figure 1:
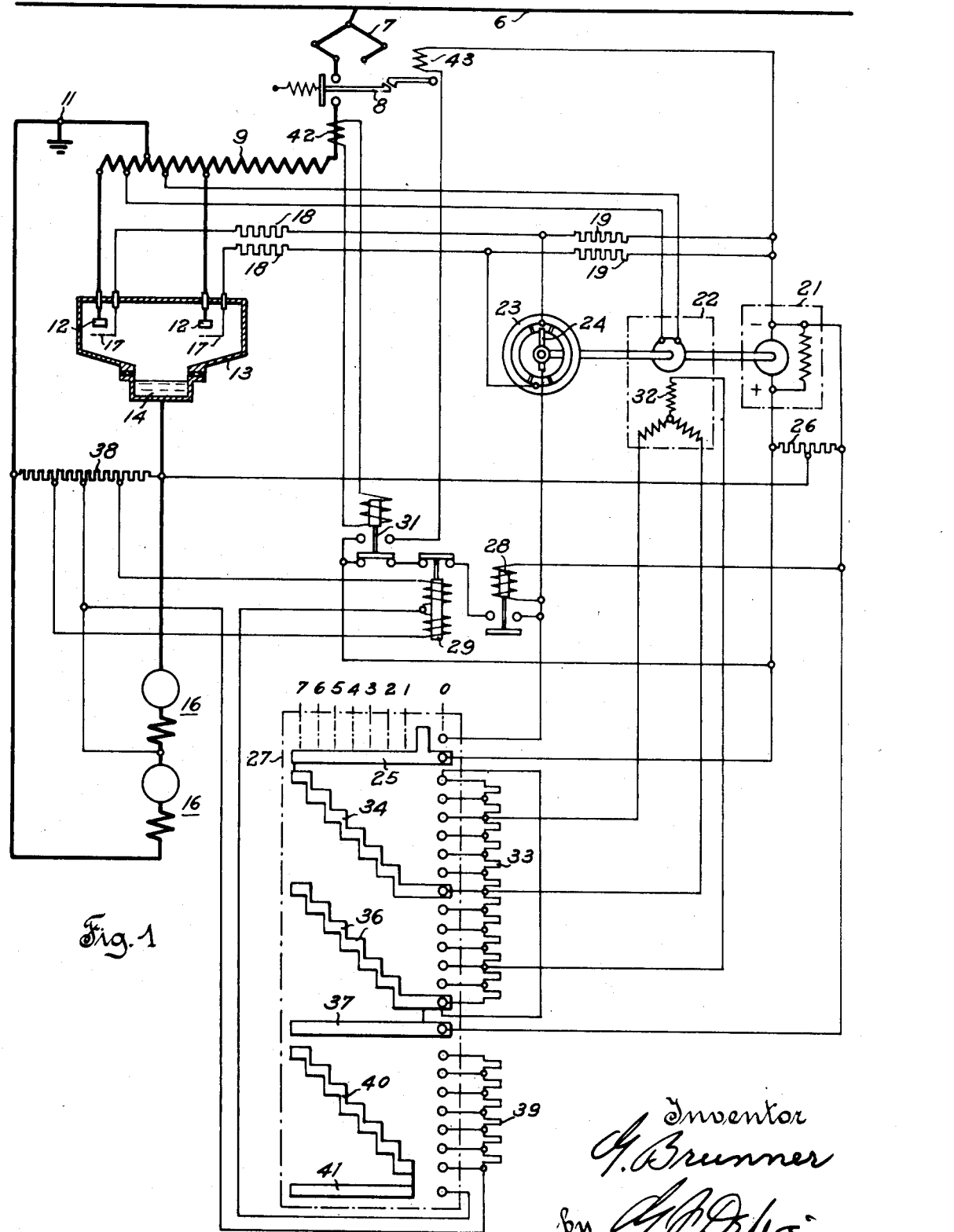

Nov. 13, 1934.  G. BRUNNER  1,980,950
MOTOR CONTROL SYSTEM
Filed May 16, 1934  2 Sheets-Sheet 1

Patented Nov. 13, 1934

1,980,950

UNITED STATES PATENT OFFICE 1,980,950

MOTOR CONTROL SYSTEM

Gustav Brunner, Baden, Switzerland, assignor to Aktiengesellschaft Brown Boveri & Cie., Baden, Switzerland, a joint-stock company of Switzerland Application May 16, 1934, Serial No. 725,906
In Germany April 7, 1933

12 Claims. (Cl. 172—179)

This invention relates in general to improvements in control systems for a plurality of jointly operated electric motors and more particularly to means for avoiding continuance of any slippage of a pair of driving wheels of the vehicle having a plurality of independently driven axles.

It is frequently desired to jointly operate a plurality of electric motors operating at normal speeds in predetermined relation resulting from some mechanical interconnection between the motors. Unless however such mechanical connection is reasonably permanent, means should be provided to prevent continuance of any departure, resulting from a failure of such mechanical interconnection, of the normal speed relationship of such motors from the normal value thereof. Such condition frequently occurs in vehicles in which the several axles are independently driven by individual motors and in which the wheels of some axles may slip on the rails while the remainder of the wheel retains normal adhesive contact therewith. The flow of current through the motors should then be interrupted or at least reduced to enable the slipping wheel to regain adhesion with the rails, the flow of current being subsequently reestablished in the normal manner. When the motors receive current from a sourse through an electric valve operable to regulate or to interrupt the flow of current therethrough, such regulation or interruption of the flow of current is advantageously effected by means of the controlling members of the valve to thereby obtain a more rapid control of the current and avoid wear of the circuit breaker usually utilized for such interruption.

It is therefore one of the objects of the present invention to provide a control system for a plurality of electric motors receiving current from a source through an electric valve.

Another object of the present invention is to provide a control system for a plurality of electric motors in which system the flow of current is controlled in response to the relative speed conditions of the motors.

Another object of the present invention is to provide a control system for a plurality of electric motors in which the flow of current through the motors is reduced upon occurrence of a disturbance in the speed relationship between the motors.

Another object of the present invention is to provide a control system for a plurality of electric motors in which the flow of current through the motors is interrupted by means of an electric valve upon occurrence of a disturbance in the speed relationship between the motors.

Figure 2:
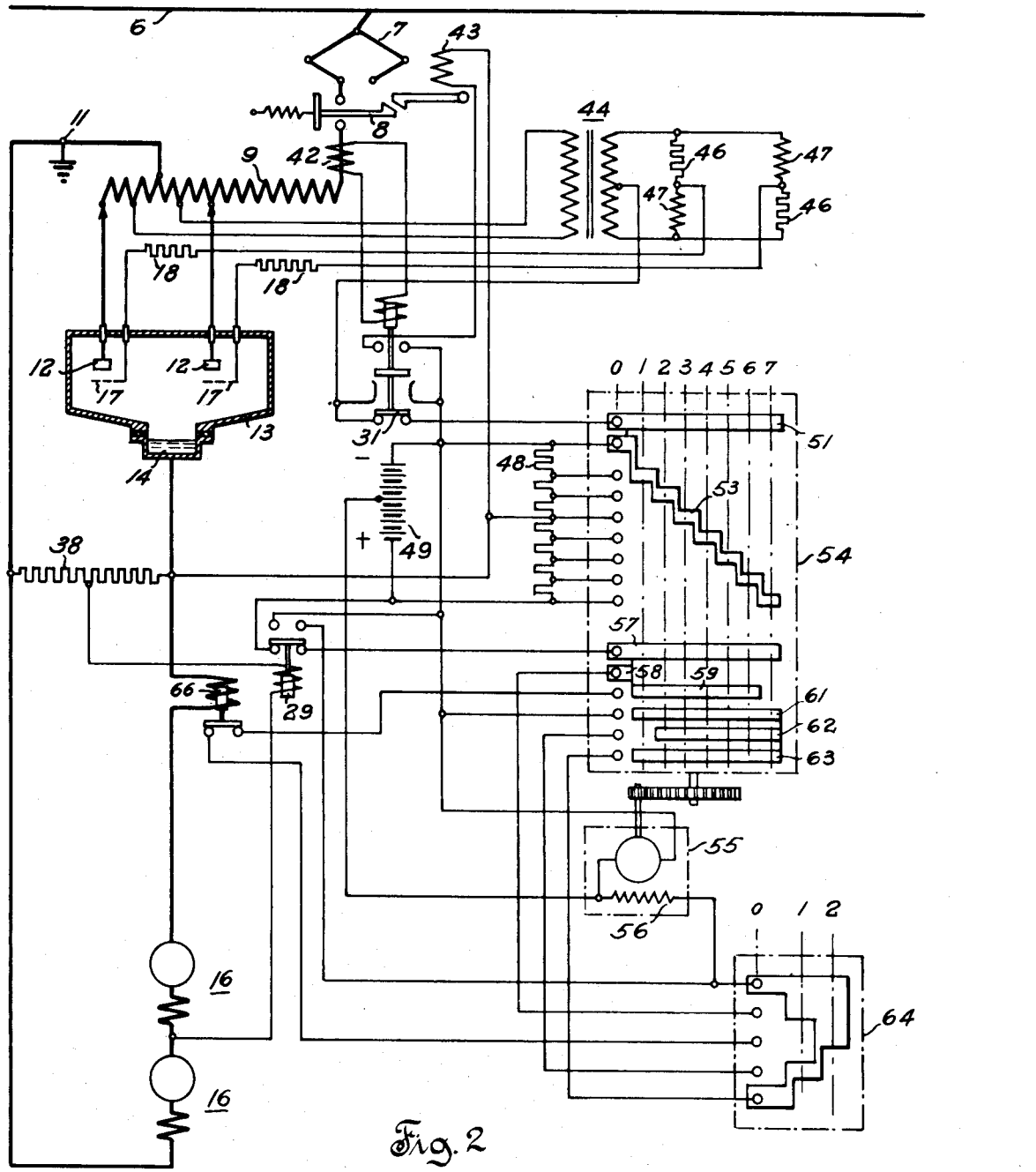

Objects and advantages other than those above set forth will be apparent to those skilled in the art upon consideration of the following description when read in connection with the accompanying drawings, in which:

Fig. 1 diagrammatically illustrates one embodiment of the present invention applied to the control of two of the traction motors of an electric vehicle and in which the flow of current to the motors is interrupted by an electric valve upon slippage of one of the driving axles; and Fig. 2 diagrammatically illustrates another embodiment of the present invention in which the flow of current to the motors is reduced, by an electric valve, upon slippage of one of the driving axles to the extent required for preventing continuance of such slippage.

Referring more particularly to the drawings by characters of reference, reference numeral 6 designates a suitable source of current herein represented as a trolley wire assumed to be energized by suitable alternating current generating means (not shown) connected between wire 6 and ground. Current is drawn from wire 6 by means of a current collector 7 and is supplied through the contacts of a circuit breaker 8 to a terminal of the winding 9 of an auto-transformer having a terminal thereof connected to ground as at 11. Winding 9 is provided with additional terminals which are preferably equidistant from the ground terminal and which are severally connected with the anodes 12 of an electric valve of any suitable type such as a valve of the vapor type 13 having a cathode 14. Valve 13 is provided with the usual discharge igniting and maintaining means which are well known and are therefore not known.

The present embodiments illustrate two motors 16 of similar construction serially connected between cathode 14 and ground, but it will be understood that the system may be adapted to the control of any number of motors in any desired connection by suitable modification of the elements shown. The flow of current through anodes 12 of valve 13 is controlled by means of suitable control electrodes 17 in response to the energization of such control electrodes at suitable voltages with respect to the voltage of cathode 14 taken as datum for the control voltages. In the embodiment illustrated in Fig. 1, the control electrodes 17 are severally connected through resistors 18 and 19 with the negative terminal of a suitable source of direct current such as a direct current generator 21 driven for example by a synchronous motor 22 having the armature thereof energized from winding 9. The control electrodes 17 are also connected with the positive terminal of generator 21 through resistor 18, through the segments of a distributor 23 and by other means to be more fully described, the distributor having the brush 24 thereof driven in relation with the voltage cycle of line 6 as a result of the connection thereof with the shaft of motor 22. The voltages of the terminals of generator 21 are maintained in invariable relation with respect to the voltage of cathode 14 by means of a voltage divider 26 having the terminals thereof connected across generator 21 and having an intermediate tap connected with cathode 14.

The operation of the system is controlled by means of a manually operated controller 27 effecting a transitory connection between brush 24 and generator 21 between the zero position and the first running position of the controller. Such connection also causes energization of the coil of the relay 28 from generator 21. When relay 28 has operated, the contacts thereof provide a permanent connection between generator 21 and the coil of the relay through the contacts of additional relays 29 and 31. Such connection also maintains brush 24 connected with generator 21. Motor 22 is provided with a field winding 32 having a plurality of angularly displaced portions to permit adjustment of the angular position of the magnetic field of the motor. Adjustment of such position permits variation of the momentary position of the armature of the motor during the voltage cycle of the supply line and thus varies the amount of engagement of brush 24 with the contacts of distributor 23 during such cycle. The several portions of winding 32 receive current from generator 21 through a voltage divider 33 and through segments 25, 34, 36 and 37 of controller 27 permitting variation of the distribution of the flow of current to such portions.

Another voltage divider 38 is connected between cathode 14 and ground and is provided with a midtap connected with the junction point of motors 16. Voltage divider 38 is thus divided into two half portions each receiving the voltage at the terminals of one of motors 16. Relay 29 is provided with two operating coils each connected across a portion of one-half of voltage divider 38, such coils being so wound that, during normal operation of motors 16, the effect of such coils oppose and neutralize each other and the relay 29 remains in the position shown, whereas upon departure of the speeds of motors 16 from the normal relationship thereof, the effect of the coils of relay 29 no longer neutralize each other thereby causing relay 29 to open the contacts thereof. The sensitivity of relay 29 may be adjusted in response to the magnitude of the voltage impressed on motors 16 by insertion, by controller 27, of a variable amount of a resistor 39 in the common connection of the coils of the relay. The coil of relay 31 is energized from a current transformer 42 inserted in circuit with auto-transformer 9, whereby the relay is caused to operate in response to the occurrence of flow of excessive current through the transformer to thereby open the connections between brush 24 and generator 21 and thereafter close the connection between generator 21 and the trip coil 43 of circuit breaker 8.

In operation, the system being arranged as shown and line 6 being energized, upon closure of circuit breaker 8 auto-transformer 9 receives current and energizes the armature of motor 22 which starts as an induction motor. Rotation of generator 21 driven by motor 22 causes such generator to excite itself and to supply current to field winding 32 of motor 22 through segments 25, 34, 36 and 37 of controller 27 and voltage divider 33. Motor 22 thereupon operates as a synchronous motor and drives brush 24 in synchronous relation with the voltage cycle of line 6. The connection between brush 24 and the positive terminal of generator 21 being open, control electrodes 17 are connected with only the negative terminal of generator 21 both through resistor 19 and through distributor 23 and the coil of relay 28. Upon striking of an arc within valve 13 by the igniting means thereof, the flow of current through anodes 12 therefore remains blocked by control electrodes 17. Movement of controller 27 from the zero position thereof to the first running position thereof causes the segment 25 to momentarily connect the coil of relay 28 across generator 21. Relay 28 closes the contacts thereof, thereby establishing a circuit from the positive terminal of generator 21 through the contacts of relays 31, 29 and 28, such circuit continuing on the one hand through the coil of relay 28 to the negative terminal of generator 21 and on the other hand through brush 24, distributor 23, resistors 18, control electrodes 17, cathode 14, to the midtap of voltage divider 26 and to generator 21. Such connections are maintained by relay 28 regardless of the position of controller 27 as long as relays 29 and 31 do not open the contacts thereof.

Brush 24 thus being permanently connected with the positive terminal of generator 21 impresses a positive voltage impulse once per cycle on each control electrode 17, such voltage impulse being of a magnitude effective to release the flow of current through the associated anode 12. The connections between winding 32 and generator 21 are so adjusted that each control electrode 17 receives such potential impulse during the latter portion of the positive voltage half cycle of the associated anode 12 to thereby release the flow of a current not exceeding the maximum permissible value thereof. Motors 16 are thus caused to rotate and controller 27 may be brought to the following operating position thereof. Such movement of controller 27 changes the point of connection of segments 34 and 36 with voltage divider 33, thereby varying the distribution of current to the several portions of winding 32. The connections between winding 32 and voltage divider 33 are so arranged that such movement results in shifting the rotor of motor 22 by a small angle in the direction of rotation thereof, whereby the times of engagement of brush 24 with the segments of distributor 23 are advanced with respect to the voltage cycle of line 6. The flow of current through anode 12 is therefore caused to occur at a higher voltage to overcome the increasing counterelectromotive forces of motors 16. Such action is repeated for every position of controller 27, the controller being preferably so arranged that, at the last operating position thereof, the control electrodes have no action on the flow of current through anodes 12 and such flow of current therefore occurs at the maximum voltage obtainable from auto-transformer 9.

During such operation, if the voltages across the two motors 16 are substantially equal, relay 29 will remain in the position shown. If the wheels connected with one of the motors slip on the track, the counterelectromotive force of such motor increases above the value of the counterelectromotive force of the other motor. Such action results in the flow of unequal currents through the coils of relay 29 and the production thereby of a differential magnetic flux causing such relay to open the contacts thereof. The coil of relay 28 is then deenergized and brush 24 is permanently disconnected from the positive terminal of generator 21. Control electrodes 17 are therefore permanently maintained at the voltage of the negative terminal of generator 21 and cause the flow of current through valve 13 to be interrupted. Such flow of current can only be reestablished by returning controller 27 to the zero position thereof to thereby again cause momentary energization of the coil of relay 28 and reclosure of such relay. Controller 27 may then be returned to any of the running positions thereof to cause continued propulsion of the vehicle.

In the absence of resistor 39, relay 29 would operate in response to the appearance of a difference of predetermined amount between the voltages of the two motors 16. For a given difference in the speed of the motors however the difference between the terminal voltages of the motors varies in proportion to the voltage impressed thereon, so that relay 29 would be too sensitive when such impressed voltage is high and would lack sensitivity when the impressed voltage is low. When the impressed voltage is low as a result of movement of controller 27 to the first position thereof, resistor 39 is short circuited by segments 40 and 41 and relay 29 is given its maximum sensitivity. As the impressed voltage is increased by movement of the controller, an increasing amount of resistor 39 is inserted in the common connection of the coil of relay 29 thereby requiring the greater unbalance in the voltages upon the two motors to cause the predetermined unbalance between the currents in the coils of relay 29. By suitable adjustment of resistor 39 the sensitivity of relay 29 may be adjusted to cause operation of the relay upon departure of the speed relationship of motors 16 from the normal value thereof to a predetermined extent, regardless of the value of the voltage impressed on the motors.

Upon occurrence of a disturbance of any nature causing the flow of excessive current through winding 9 and current transformer 42, relay 31 opens the connection of the positive terminal of generator 21 with the coil of relay 28 and with brush 24. Such operation of relay 31 has the same result as the operation of relay 29 in causing a permanent interruption of the flow of current through valve 13 and in preventing such flow of current from being reestablished until after return of controller 27 to the zero position thereof. Upon interruption of the flow of current through valve 13, relay 31 returns to the position shown. If, however, control electrodes 17 should fail to interrupt the flow of current through the valve for any reason and such flow of current continues to occur at an excessive value, relay 31 closes the circuit of trip coil 43 of circuit breaker 8, thereby causing such circuit breaker to interrupt the circuit of auto-transformer 9.

In a system as above described valve 13 constitutes means for controlling the flow of current from line 6 to motors 16. Generator 21 and distributor 23 impress, on each control electrodes 17, a voltages of sign and magnitude effective to release the flow of current through valve 13. Controller 27 controls valve 13 and is operable to cause initiation and interruption of the flow of current from line 6 to motors 16. The controller also controls the action of distributor 23 to vary the times of impression of the control voltages on the control electrodes during the cycle of the voltage of winding 9 to regulate the action of valve 13 and thereby regulate the magnitude of the flow of current through motor 16. Relay 29 operates in response to the occurrence of a disturbance in the speed relationship between motors 16 for controlling the operation of valve 13, by maintaining control electrodes 17 at a voltage of sign and magnitude effective to cause interruption of the flow of current to valve 13. The relay thus controls the operation of motors 16 in causing interruption of the flow of current therethrough and also in rendering controller 27 ineffective. The action of relay 29 is controlled by resistor 39 which is in turn controlled by controller 27. Relay 28 prevents the reestablishment of the flow of current through valve 13 and motors 16 until after return of controller 27 to the current interrupting position thereof. Relay 31 is responsive to the magnitude of the flow of current through the system for controlling the operation of valve 13. Relays 29 and 31 cooperate in controlling the action of controller 27 as a result of the connections therebetween.

In the embodiment illustrated in Fig. 2, anodes 12 are shown as being variably connected with winding 9 for the purpose of providing a second means of regulation of the voltage impressed on motors 16. Control electrodes 17 receive alternating voltages from line 6 through a transformer 44 and through suitable means for adjusting the phase relation between the voltages of control electrodes 17 and the voltage of winding 9. Such means may include a plurality of resistors 46 and a plurality of reactors 47 as is well known in the art. The secondary winding of transformer 44 is provided with a midtap connected through contacts of relay 31 with a voltage divider 48 having a midtap connected with cathode 14 and receiving current from a suitable source of direct current such as a battery 49. Such connection is variably effected by means of segments 51 and 53 of a remotely controlled controller 54 to cause impression of a common variable direct current voltage component of positive or negative sign on each control electrode in addition to the alternating voltage component thereof. Controller 54 is herein shown as being actuated by a direct current motor 55 having a field 56 connected with the midtap of battery 49 and connected with the one or with the other terminal of battery 49 through segments 57, 58, 59, 61, 62 or 63 of controller 54 and through a master controller 64. Motor 55 drives controller 64 through suitable transmission gears which may include a gear of the Geneva type. Master controller 64 is provided with only three positions, a zero position, a starting position and an accelerating position, the latter controlling the movement of controller 54 under the action of the usual accelerating relay 66. It will be understood that any other type of controller may also be utilized without thereby departing from the spirit of the invention. It will also be understood that controller 54 may also control suitable means (not shown) for changing the taps of auto-transformer 9.

In the present embodiment, relay 29 is provided with only one coil which is connected between the midtap of voltage divider 38 and the junction point of motors 16. Relay 29 normally connects segment 57 of distributor 54 with the positive terminal of battery 49, the relay being provided with additional contacts connecting field winding 56 with the negative terminal of battery 49 upon operation of the relay. Relay 31 is provided with a pair of sliding contacts to connect the neutral point of the secondary winding of transformer 44 with the negative terminal of battery 49 before the relay closes the circuit of coil 43.

In operation, the system being connected as shown and line 6 being energized, closure of circuit breaker 8 causes transformer 44 to be energized. Control electrodes 17 then receive alternating current voltages superimposed on a negative direct current voltage through similar circuits comprising resistors 18, resistors 46, reactors 47, the secondary winding of transformer 44, contacts of relay 31, segments 51 and 53 of controller 54 to the negative terminal of battery 49. Such voltages are so adjusted that the control electrodes are thereby maintained at continuously negative variable voltages to thereby prevent the flow of current through valve 13. Motor 55 then remains inoperative, although the armature thereof is permanently connected with battery 49, because the circuit of field 56 is uncompleted. Movement of master controller 64 to position 1 completes a circuit from the positive terminal of battery 49 through the contacts of relay 29, segments 57 and 58, master controller 64, field 56 back to battery 49. Motor 55 thus being operatively energized moves controller 54 to the first running position thereof, in which position the circuit of field 56 is interrupted at segment 58, thereby causing motor 55 and controller 54 to remain in the position reached thereby. As a result of the movement of controller 54, each control electrode 17 receives, in addition to an alternating voltage component, a negative direct current voltage component which is less than the voltage of the negative terminal of battery 49. Such voltage component can be so adjusted that control electrodes 17 become positive during the latter part of the positive voltage half cycles of anodes 12 to thereby release the flow of current at low voltage through valve 13 and motor 16.

Movement of master controller 64 into position 2 again causes energization of field 56 through a circuit from the positive terminal of battery 49, through contacts of relay 29, segments 57 and 59, contacts of accelerating relay 66 and master controller 64. Motor 55 then again drives controller 54 until the circuit of field 56 is opened at segment 59. During such movement controller 54 gradually decreases the negative direct current voltage component impressed on control electrodes 17 through segments 51 and 53 and thereafter substitutes therefor the positive component of increasing value reaching the voltage of the positive terminal of battery 49. As a result thereof the moments of the voltage cycle at which each control electrode 17 becomes positive are gradually advanced until such moments reach the beginning of the positive half cycles of the anodes and the control electrodes are then without action. Valve 13 accordingly controls the flow of current through motor 16 at an increasing voltage, the flow of current being dependent upon the value of such voltage and upon the counterelectromotive force of motors 16. Whenever such current exceeds a predetermined value relay 66 opens the contact thereof and momentarily opens the circuit of field 56, thereby preventing further movement of controller 54 until the flow of current through motor 16 has again decreased below a predetermined value.

Controller 54 being in any of the positions 2 to 7 thereof, when master controller 64 is returned to the starting position thereof a circuit is completed from the negative terminal of battery 49 through segments 61 and 62, master controller 64 and field 56 back to battery 49. The flow of current through field 56 is then opposed to the flow of current previously considered and motor 55 returns controller 54 to the position 1 thereof, whereupon the circuit of field 56 is opened at segment 62 and controller 54 stops. Master controller 64 being returned to the zero position thereof, completes the circuit of field 56 from the negative terminal of battery 49 through segments 61 and 63, thereby causing return of controller 54 to the zero position thereof, at which the circuit of field 56 is opened at contact 63 and the controller stops. The master controller may also be returned from the second position thereof to the zero position thereof with the result that controller 54 will return to its zero position.

Regardless of the operating position of controller 54, when the speed relationship of motors 16 is disturbed a voltage is impressed on the coil of relay 29 which opens the connection between battery 49 and segment 57 and connects field 56 with the negative terminal of battery 49 thereby causing controller 54 to return towards its zero position. Controller 54 accordingly causes the voltage impressed on motors 16 through valve 13 to decrease and the flow of current through such motors is gradually decreased. Such action continues until the flow of current through motors 16 is decreased to an extent sufficient to permit the slipping wheels of the vehicle to regain their adhesion. The normal speed relationship of the motors thus being reestablished, the coil of relay 29 is no longer energized and controller 54 gradually returns to the operating position previously reached thereby in accordance with the position of master controller 64, thereby again increasing the flow of current to motors 16. Such action of relay 29 may be repeated a plurality of times until the cause of slippage of the wheel has been removed or until the vehicle has been sufficiently accelerated to avoid further slippage of the wheel even when the motors receive the maximum value of current permitted by accelerating relay 66.

Upon occurrence of a flow of excessive current through current transformer 42, relay 31 opens the connection of segment 51 with transformer 44 and connects transformer 44 with the negative terminal of battery 49 to cause interruption of the flow of current through valve 13. Such connection is effected through sliding contacts to permit further movement of relay 31 upon any failure of the control electrodes to interrupt the flow of current, to energize the trip coil 43 of circuit breaker 8 from battery 49.

In the present embodiment, controller 54 serves for regulating the action of valve 13 in a manner similar to that of controller 27 in the embodiment illustrated in Fig. 1. Controller 54 also cooperates with transformer 44, resistors 46, reactors 47, voltage divider 48, and battery 49 to impress, on control electrodes 17, voltages of sign and magnitude effective to release the flow of current through valve 13 to control the flow of current from line 6 to motors 16. Relay 29 causes such means to decrease the magnitude of the flow of current through motors 16 to thereby cause termination of a disturbance in the speed relationship between the motors 16 and thereafter increase the flow of current through the motors. Relay 66 operates similarly to relay 31 to the extent of being responsive to the magnitude of the flow of current to the system and cooperates with relay 29 in controlling the operation of the controller.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric motor control system, an electric current supply line, a plurality of electric motors connected with said line, electric valve means for controlling the flow of current through said motors, and means responsive to the occurrence of a disturbance in the speed relationship between said motors for causing the last said means to decrease the magnitude of the flow of current through said motors to thereby cause termination of the disturbance.

2. In an electric motor control system, an electric current supply line, a plurality of electric motors connected with said line, electric valve means for controlling the flow of current through said motors, and means responsive to the occurrence of a disturbance in the speed relationship between said motors for causing the last said means to decrease the magnitude of the flow of current through said motors to thereby cause termination of the disturbance and to thereafter increase the flow of current through said motors.

3. In an electric motor control system, an electric current supply line, a plurality of electric motors connected with said line, an electric valve controlling the flow of current from said line through said motors, means for controlling said valve and operable to cause initiation and interruption of the flow of current through said motors, means responsive to the occurrence of a disturbance in the speed relationship between said motors and controlling said valve to cause interruption of the flow of current therethrough, and means for preventing reestablishment of the flow of current through said valve until after return of the first said means to the current interrupting position thereof.

4. In an electric motor control system, an electric current supply line, a plurality of electric motors connected with said line, an electric valve controlling the flow of current from said line through said motors, a controller for controlling said valve and operable to cause initiation and interruption of the flow of current through said motors, means responsive to the occurrence of a disturbance in the speed relationship between said motors for controlling said valve to cause interruption of the flow of current therethrough, and means for preventing reestablishment of the flow of current through said valve until after return of said controller to the current interrupting position thereof.

5. In an electric motor control system, an electric current supply line, a plurality of electric motors connected with said line, an electric valve for controlling the flow of current through said motors, means for regulating the action of said valve, and means responsive to the occurrence of a disturbance in the speed relationship between said motors for controlling the operation of said valve and for rendering said regulating means ineffective.

6. In an electric motor control system, an electric current supply line, a plurality of electric motors connected with said line, an electric valve for controlling the flow of current through said motors, means responsive to the occurrence of a disturbance in the speed relationship between said motors for controlling the operation of said valve, means responsive to the magnitude of the flow of current through said system for controlling the operation of said valve, and means controlled by the said two means for regulating the flow of current through said valve.

7. In an electric motor control system, an electric current supply line, a plurality of electric motors connected with said line, an electric valve for controlling the flow of current through said motors, means for regulating the action of said valve, means responsive to the occurrence of a disturbance in the speed relationship between said motors for controlling the operation of said valve and for rendering said regulating means ineffective, and means controlled by the first said means for controlling the action of the second said means.

8. In an electric motor control system, an electric current supply line, a plurality of electric motors connected with said line, a controller for regulating the flow of current through said motors, means responsive to the occurrence of a disturbance in the speed relationship between said motors for controlling the flow of current therethrough, and means responsive to the position of said controller for controlling the said means.

9. In an electric motor control system, an electric current supply line, an electric valve connected with said line and having an anode with an associated control electrode and a cathode, a plurality of electric motors connected with said valve, means for impressing on said control electrode a voltage of sign and magnitude effective to release the flow of current through said valve, and means responsive to the occurrence of a disturbance in the speed relationship between said motors for maintaining said control electrode at a voltage of sign and magnitude effective to cause interruption of the flow of current through said valve.

10. In an electric motor control system, an electric current supply line, an electric valve connected with said line and having an anode with an associated control electrode and a cathode, a plurality of electric motors connected with said valve, means for impressing on said control electrode a voltage of sign and magnitude effective to release the flow of current through said valve, means for controlling the action of the first said means to regulate the magnitude of the flow of current through said valve, and means responsive to the occurrence of a disturbance in the speed relationship between said motors for maintaining said control electrode at a voltage of sign and magnitude effective to cause interruption of the flow of current through said valve.

11. In an electric motor control system, an electric current supply line, an electric valve connected with said line and having an anode with an associated control electrode and a cathode, a plurality of electric motors connected with said valve, an alternating current winding connected with said line and with said valve, means for impressing on said control electrode a voltage of sign and magnitude effective to release the flow of current through said valve, means for varying the times of impression of said voltages during the cycle of the voltage of said winding, and means responsive to the occurrence of a disturbance in the speed relationship between said motors for maintaining said control electrode at a voltage of sign and magnitude effective to cause interruption of the flow of current through said valve.

12. In an electric motor control system, an electric current supply line, an electric valve connected with said line having an anode with an associated control electrode and a cathode, a plurality of electric motors connected with said valve, an alternating current winding connected with said line and with said valve, means for impressing on said control electrode a voltage of sign and magnitude effective to release the flow of current through said valve, means for varying the times of impression of said voltages during the cycle of the voltage of said winding, and means responsive to the occurrence of a disturbance in the speed relationship between said motors for controlling the action of the said means to decrease the magnitude of the flow of current through said motors and thereby to cause termination of the disturbance.

GUSTAV BRUNNER.